H. R. EDGECOMB.
METAL CARBON BRUSH.
APPLICATION FILED DEC. 26, 1913.
1,202,818.
Patented Oct. 31, 1916.
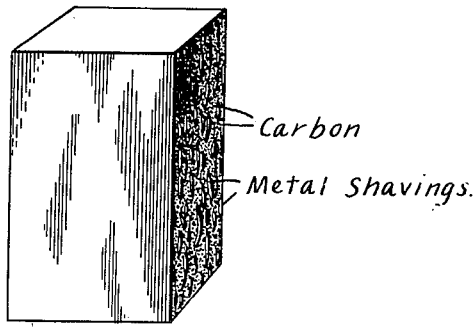
Carbon
Metal Shavings.
WITNESSES:
INVENTOR
Henry R. Edgecomb
BY
ATTORNEY

UNITED STATES PATENT OFFICE.

HENRY R. EDGECOMB, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

METAL-CARBON BRUSH.

1,202,818.  Specification of Letters Patent.  Patented Oct. 31, 1916.

Application filed December 26, 1913. Serial No. 808,904.

*To all whom it may concern:*

Be it known that I, HENRY R. EDGECOMB, a citizen of the United States, and a resident of Edgewood Park, in the county of Allegheny and State of Pennsylvania, have invented a new and useful Improvement in Metal-Carbon Brushes, of which the following is a specification.

My invention relates to metal-carbon brushes, and it has particular reference to current collectors such as are employed in connection with dynamo-electric machines.

My invention has for one of its objects to provide a brush of the character above described in which are combined the lubricating properties of a carbon brush and a degree of conductivity which approaches that of a metal brush.

A second object of my invention is to provide a simple and efficient process for the economical manufacture of electrical conductors.

It is desirable to employ carbon brushes as current collectors to avoid the wear of the commutator cylinder and sparking which are incident to the use of metallic brushes. Carbon brushes, however, have relatively low conductivity and are less durable than metal brushes.

I have provided a brush which is composed of carbon, or other lubricating material, and metal and in which are combined the good qualities of metallic and carbon brushes. In carrying out my invention, metal and carbon, or other lubricating material, are united in a manner to be described. The figure on the drawing illustrates the brush.

The process consists in first forming a body of sheets of metal, such as copper, or a suitable alloy, the faces of the sheets having been previously tinned. The plates are clamped together in such a manner that they may be mounted in a lathe for turning. The body thus formed is then placed in a lathe, and a suitable tool, as, for example, a blade which may extend all or part way across the body, is employed for cutting very fine thread-like shavings of the materials. This may be performed with equal facility in a milling machine. A flux is applied to the tinned plates before they are clamped together for turning, in which case, the uniform distribution of the flux throughout the mass of shavings is insured. The shavings are collected in a moving trough of substantially the same width as the cutting tool or blade, so that the shavings will lie transversely to the lengthwise axis of the trough. Carbon, preferably in the form of graphite powder, is then sprinkled over them. The flux previously applied to the plates is preferably of such a character as to cause the graphite to adhere readily to the shavings and thus form a substantially uniform coating over them. The mixture of metal shavings and graphite powder and flux is then collected in molds as it comes from the moving trough, preferably, with the threads or shavings of metal extending lengthwise in the mold in order to thereby increase the longitudinal conductivity of the brush thus formed. Pressure is then applied to the mixed materials in the molds and they are, at the same time, heated to a temperature at which the tin is caused to flow and fuse the particles together. The brushes are then allowed to cool, whereupon they may be removed from the molds.

The resultant product is a hard compact mass of combined metal and graphite. The conductor is homogeneous in composition and its longitudinal conductivity is high because the threads or shavings extend longitudinally of the brush.

A brush constructed in accordance with my invention is durable and yet operates without material wear of the commutator cylinder.

The respective proportions of tin and copper employed in the above described process may be varied by varying the thickness of the sheets of copper that form the body to be turned, the thickness of the coating of tin on the faces of the sheets remaining substantially the same. Any other suitable metal or alloy, such as lead, zinc, or alloys of either tin, lead or zinc, having a sufficiently low melting point, may be employed instead of tin. Bronze, brass, or suitable metal, may be employed instead of copper.

One of the principal advantages of the processes that are above described is the economical method of preparing the metal particles. The methods, either chemical or mechanical, that must be employed for producing the metal in a powdered form or in a finely divided state, require a large amount of time or labor and are much more expensive than the method I have provided. The metal in sheet form is much cheaper than it is in a finely divided or powdered form and the process of machining is very much less expensive than the process of preparing the metals in finely divided condition. The process of machining the metal is also one that may be performed by comparatively unskilled labor.

I claim as my invention:

1. The process of manufacturing electric conductors which consists in forming metallic threads, portions of which have a lower melting point than other portions thereof, mixing lubricating material with the metallic threads, and then heating the mixture to a temperature above the melting point of the more fusible metal while applying pressure to the said mixture.

2. The process of manufacturing electric conductors which consists in machining a body of metal comprising portions having different melting points, to form thread-like shavings, mixing lubricating material with said shavings and then heating the mixture to a temperature above the melting point of the more fusible metal while applying pressure to the said mixture.

3. The process of manufacturing electric conductors which consists in machining a body of copper and a metal having a lower melting point to form thread-like shavings, mixing finely divided graphite with said shavings and then heating the mixture to a temperature above the melting point of the more fusible metal while applying pressure to the said mixture.

4. The process of manufacturing electric conductors which consists in machining a body comprising alternate layers of copper and tin to form thread-like shavings, mixing finely divided graphite with said shavings and then heating the mixture to a temperature above the melting point of the tin while applying pressure to the said mixture.

5. The process of manufacturing electric conductors which consists in machining a body comprising alternate layers of metals having different melting points, to form thread-like shavings, mixing finely divided graphite with said shavings and then heating the mixture to a temperature above the melting point of the more fusible metal while applying pressure to the said mixture.

6. The process of manufacturing electric conductors which consists in machining a body comprising alternate layers of metals having different melting points to form thread-like shavings, mixing finely divided graphite with said shavings, arranging said shavings to extend longitudinally in substantially the same direction, and then heating the mixture to a temperature above the melting point of the more fusible metal while applying pressure to the said mixture.

7. A conductor comprising a hard compact mass of compressed copper shavings and graphite and a metal having a lower melting point than said shavings.

8. An electric conductor comprising a hard compact mass of compressed metallic threads and graphite, said threads being connected by a metal having a lower melting point than said threads.

9. An electric conductor comprising a hard compact mass of compressed copper threads and graphite and additional metallic portions having a lower melting point than the said copper threads.

10. An electric conductor comprising a hard compact mass of compressed copper threads and finely divided graphite and portions of tin between said threads.

In testimony whereof, I have hereunto subscribed my name this 18th day of Dec., 1913.

HENRY R. EDGECOMB.

Witnesses:
O. W. A. OETTING,
B. B. HINES.